US007736585B2

(12) United States Patent
Sekine

(10) Patent No.: US 7,736,585 B2
(45) Date of Patent: Jun. 15, 2010

(54) METAL POWDER WITH NANO-COMPOSITE STRUCTURE AND ITS PRODUCTION METHOD USING A SELF-ASSEMBLING TECHNIQUE

(75) Inventor: Shigenobu Sekine, Tokyo (JP)

(73) Assignee: Napra Co., Ltd, Tokyo (JP)

( * ) Notice: Subject to any disclaimer, the term of this patent is extended or adjusted under 35 U.S.C. 154(b) by 0 days.

(21) Appl. No.: 12/453,376

(22) Filed: May 8, 2009

(65) Prior Publication Data

US 2009/0304834 A1 Dec. 10, 2009

Related U.S. Application Data

(60) Division of application No. 11/369,843, filed on Mar. 8, 2006, now Pat. No. 7,547,346, which is a continuation of application No. 10/964,744, filed on Oct. 15, 2004, now abandoned, which is a continuation of application No. 09/804,299, filed on Mar. 13, 2001, now Pat. No. 6,808,568.

(30) Foreign Application Priority Data

Mar. 13, 2000 (JP) ............................ 2000-068490

(51) Int. Cl.
*B29B 9/00* (2006.01)

(52) U.S. Cl. ...................................... 266/202; 266/236

(58) Field of Classification Search ................. 266/202, 266/200, 236

See application file for complete search history.

(56) References Cited

U.S. PATENT DOCUMENTS

| | | | |
|---|---|---|---|
| 3,872,193 | A | 3/1975 | Smith |
| 4,613,371 | A | 9/1986 | Cheney et al. |
| 5,147,448 | A | 9/1992 | Roberts et al. |
| 5,242,508 | A | 9/1993 | McCallum et al. |
| 5,266,098 | A | 11/1993 | Chun et al. |
| 5,340,377 | A | 8/1994 | Accary et al. |
| 5,738,705 | A | 4/1998 | Anderson et al. |
| 5,855,642 | A | 1/1999 | Miller et al. |
| 5,865,873 | A | 2/1999 | Sekine et al. |
| 6,517,934 | B1 | 2/2003 | Kishimoto |
| 6,579,479 | B1 | 6/2003 | Edie et al. |

FOREIGN PATENT DOCUMENTS

| | | | |
|---|---|---|---|
| JP | 07-179912 | * | 7/1995 |
| JP | 2001-254103 | | 9/2001 |

* cited by examiner

*Primary Examiner*—Scott Kastler
(74) *Attorney, Agent, or Firm*—Westerman, Hattori, Daniels & Adrian, LLP

(57) ABSTRACT

Methods, apparatuses and systems for producing powder particles of extremely small, highly uniform spherical shape and high sphericity, composed of metal including single metals and alloys, including nanocomposite structures, using a self-assembling procedure. The invention further includes the produced spherical particles. The metal spherical particles are produced whereby molten metal, alloys or composites are directed onto a fast-rotating disk in an atmosphere containing one or more inert gases and small amounts of an oxidizing gas and the molten metal drops are dispersed as tiny droplets for a predetermined time using centrifugal force within a cooling-reaction gas, and then cooled rapidly to form solid spherical particles. The spherical particles comprise a crystalline, amorphous or porous composition, having a size of 1-300 μm±1% with a uniformity of size being ≦60-70% and a precise spherical shape of less than or equal to ±10%.

19 Claims, 9 Drawing Sheets

FIG.8

Shimazu SALD-2000A (SALD-2000A-98A2: V1.01)

[Grain occasion distribution data] (File name): Nanomizer
(Measurement date): 01/02/26
(Measurement time): 15:17:51

| Particle diameter x (µm) | Product value Q0 (%) | Difference value q0 (%) | Particle diameter x (µm) | Product value Q0 (%) | Difference value q0 (%) | Particle diameter x (µm) | Product value Q0 (%) | Difference value q0 (%) |
|---|---|---|---|---|---|---|---|---|
| (1) 700.00 | 100.00 | 0.00 | (18) 22.91 | 89.14 | 15.71 | (35) 0.75 | 0.00 | 0.00 |
| (2) 572.45 | 100.00 | 0.00 | (19) 18.73 | 73.44 | 21.76 | (36) 0.61 | 0.00 | 0.00 |
| (3) 468.14 | 100.00 | 0.00 | (20) 15.32 | 51.67 | 18.70 | (37) 0.50 | 0.00 | 0.00 |
| (4) 382.84 | 100.00 | 0.00 | (21) 12.53 | 32.97 | 16.88 | (38) 0.41 | 0.00 | 0.00 |
| (5) 313.08 | 100.00 | 0.00 | (22) 10.25 | 16.09 | 10.85 | (39) 0.34 | 0.00 | 0.00 |
| (6) 256.04 | 100.00 | 0.00 | (23) 8.38 | 5.24 | 4.64 | (40) 0.27 | 0.00 | 0.00 |
| (7) 209.38 | 100.00 | 0.00 | (24) 6.85 | 0.61 | 0.61 | (41) 0.22 | 0.00 | 0.00 |
| (8) 171.23 | 100.00 | 0.00 | (25) 5.60 | 0.00 | 0.00 | (42) 0.18 | 0.00 | 0.00 |
| (9) 140.03 | 100.00 | 0.00 | (26) 4.58 | 0.00 | 0.00 | (43) 0.15 | 0.00 | 0.00 |
| (10) 114.51 | 99.99 | 0.02 | (27) 3.75 | 0.00 | 0.00 | (44) 0.12 | 0.00 | 0.00 |
| (11) 93.65 | 99.97 | 0.07 | (28) 3.06 | 0.00 | 0.00 | (45) 0.10 | 0.00 | 0.00 |
| (12) 76.58 | 99.91 | 0.16 | (29) 2.51 | 0.00 | 0.00 | (46) 0.082 | 0.00 | 0.00 |
| (13) 62.63 | 99.75 | 0.33 | (30) 2.05 | 0.00 | 0.00 | (47) 0.067 | 0.00 | 0.00 |
| (14) 51.22 | 99.42 | 0.61 | (31) 1.68 | 0.00 | 0.00 | (48) 0.055 | 0.00 | 0.00 |
| (15) 41.89 | 98.80 | 1.17 | (32) 1.37 | 0.00 | 0.00 | (49) 0.045 | 0.00 | 0.00 |
| (16) 34.25 | 97.63 | 1.85 | (33) 1.12 | 0.00 | 0.00 | (50) 0.037 | 0.00 | 0.00 |
| (17) 28.01 | 95.78 | 6.64 | (34) 0.92 | 0.00 | 0.00 | (51) 0.030 | 0.00 | 0.00 |

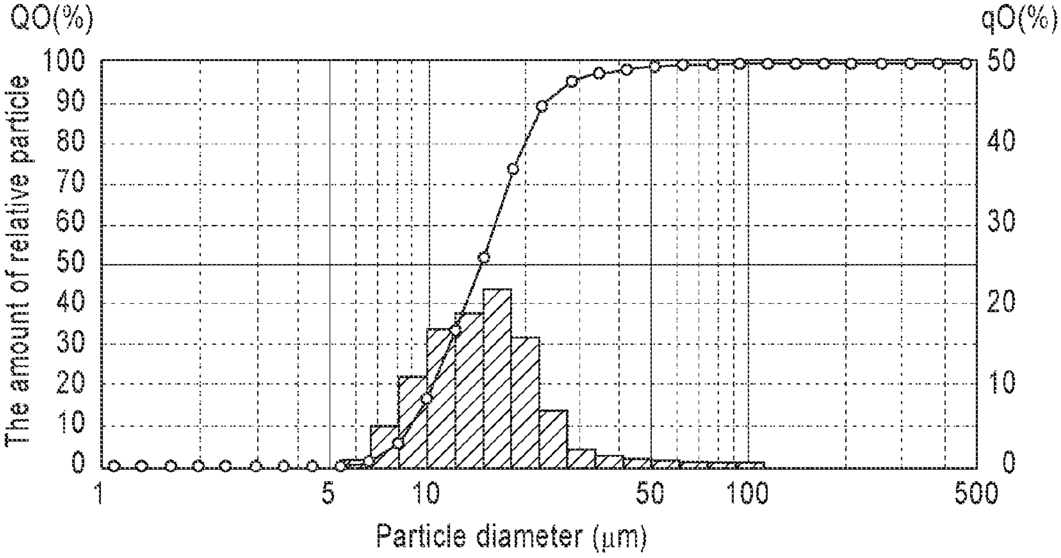

| | |
|---|---|
| S Level:0 Distribution function:Nothing D sift:0 | 75.0%D: 19.099 50.0%D: 15.021 25.0%D: 11.371 |
| | The mode diameter 17.783 |
| Refractive Index = 170-0.201 | Mean: 15.005 Standard deviation: 00.185 |

FIG.9

Shimazu SALD-2000A (SALD-2000A-98A2: V1.01)

[Grain occasion distribution data] (File name): Nanomizer
(Sample ID) (Measurement date): 01/02/20
(Measurement time): 11:07:41

| | Particle diameter x (μ m) | Product value Q0 (%) | Difference value q0 (%) | | Particle diameter x (μ m) | Product value Q0 (%) | Difference value q0 (%) | | Particle diameter x (μ m) | Product value Q0 (%) | Difference value q0 (%) |
|---|---|---|---|---|---|---|---|---|---|---|---|
| ( 1) | 700.00 | 100.00 | 0.01 | (18) | 22.91 | 89.14 | 15.71 | (35) | 0.75 | 0.00 | 0.00 |
| ( 2) | 572.45 | 99.99 | 0.03 | (19) | 18.73 | 73.44 | 21.76 | (36) | 0.61 | 0.00 | 0.00 |
| ( 3) | 468.14 | 99.96 | 0.10 | (20) | 15.32 | 51.67 | 18.70 | (37) | 0.50 | 0.00 | 0.00 |
| ( 4) | 382.84 | 99.86 | 0.21 | (21) | 12.53 | 32.97 | 16.88 | (38) | 0.41 | 0.00 | 0.00 |
| ( 5) | 313.08 | 99.66 | 0.38 | (22) | 10.25 | 16.09 | 10.85 | (39) | 0.34 | 0.00 | 0.00 |
| ( 6) | 256.04 | 99.28 | 0.69 | (23) | 8.38 | 5.24 | 4.64 | (40) | 0.27 | 0.00 | 0.00 |
| ( 7) | 209.38 | 98.59 | 5.39 | (24) | 6.85 | 0.61 | 0.61 | (41) | 0.22 | 0.00 | 0.00 |
| ( 8) | 171.23 | 93.20 | 14.66 | (25) | 5.60 | 0.00 | 0.00 | (42) | 0.18 | 0.00 | 0.00 |
| ( 9) | 140.03 | 78.54 | 17.55 | (26) | 4.58 | 0.00 | 0.00 | (43) | 0.15 | 0.00 | 0.00 |
| (10) | 114.51 | 60.99 | 12.37 | (27) | 3.75 | 0.00 | 0.00 | (44) | 0.12 | 0.00 | 0.00 |
| (11) | 93.65 | 48.62 | 9.15 | (28) | 3.06 | 0.00 | 0.00 | (45) | 0.10 | 0.00 | 0.00 |
| (12) | 76.58 | 39.47 | 12.09 | (29) | 2.51 | 0.00 | 0.00 | (46) | 0.082 | 0.00 | 0.00 |
| (13) | 62.63 | 27.38 | 8.40 | (30) | 2.05 | 0.00 | 0.00 | (47) | 0.067 | 0.00 | 0.00 |
| (14) | 51.22 | 18.97 | 5.34 | (31) | 1.68 | 0.00 | 0.00 | (48) | 0.055 | 0.00 | 0.00 |
| (15) | 41.89 | 13.63 | 4.71 | (32) | 1.37 | 0.00 | 0.00 | (49) | 0.045 | 0.00 | 0.00 |
| (16) | 34.25 | 8.92 | 4.61 | (33) | 1.12 | 0.00 | 0.00 | (50) | 0.037 | 0.00 | 0.00 |
| (17) | 28.01 | 4.31 | 3.29 | (34) | 0.92 | 0.00 | 0.00 | (51) | 0.030 | 0.00 | 0.00 |

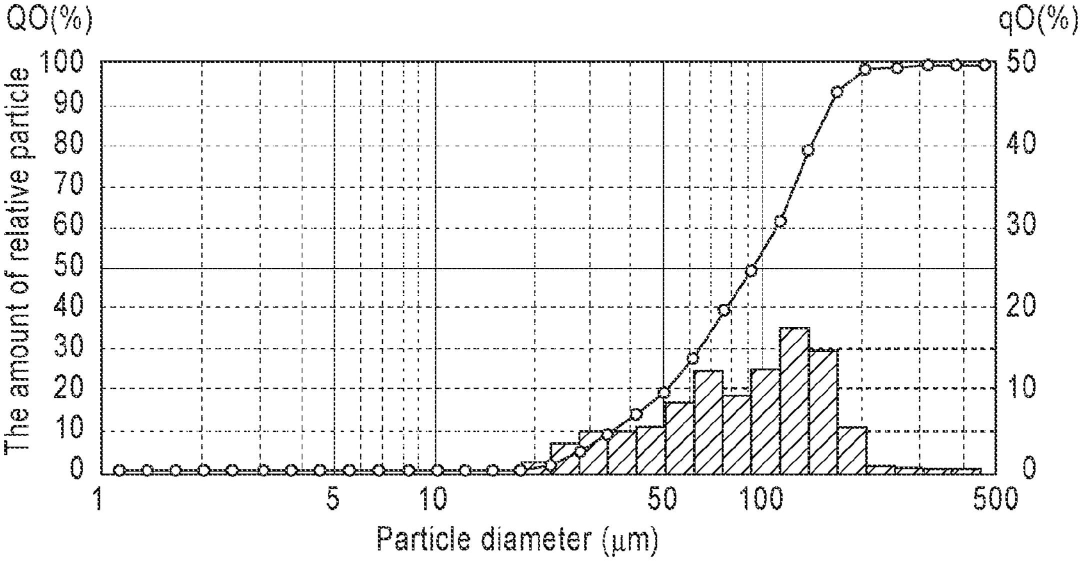

| | |
|---|---|
| S Level:0 Distribution function:Nothing D sift:0 | 75.0%D: 135.25 50.0%D: 95.973 25.0%D: 58.862 |
| | The mode diameter 141.254 |
| Refractive Index = 170-0.201 | Mean: 85.858 Standard deviation: 00.116 |

EDAX ZAF Quantification (Standardless)
Element Normalized

| Element | Wt% | At% | K-Ratio | Z | A | F |
|---|---|---|---|---|---|---|
| O K | 15.84 | 45.06 | 0.0581 | 1.1547 | 0.3174 | 1.0019 |
| PrL | 3.66 | 1.18 | 0.0391 | 0.8757 | 1.1579 | 1.0542 |
| NdL | 22.64 | 7.15 | 0.2437 | 0.8690 | 1.1656 | 1.0624 |
| FeK | 44.65 | 36.40 | 0.3964 | 1.0030 | 0.8853 | 1.0000 |
| CoK | 13.22 | 10.21 | 0.1131 | 0.9852 | 0.8687 | 1.0000 |
| Total | 100.00 | 100.00 | | | | |

EDAX ZAF Quantification (Standardless)
Element Normalized

| Element | Wt% | At% | K-Ratio | Z | A | F |
|---|---|---|---|---|---|---|
| O K | 3.79 | 14.70 | 0.0131 | 1.1865 | 0.2895 | 1.0026 |
| PrL | 4.88 | 2.15 | 0.0525 | 0.9014 | 1.1312 | 1.0559 |
| NdL | 25.71 | 11.06 | 0.2794 | 0.8946 | 1.1412 | 1.0646 |
| FeK | 52.17 | 57.94 | 0.4640 | 1.0331 | 0.8609 | 1.0000 |
| CoK | 13.45 | 14.15 | 0.1149 | 1.0152 | 0.8421 | 1.0000 |
| Total | 100.00 | 100.00 | | | | |

METAL POWDER WITH NANO-COMPOSITE STRUCTURE AND ITS PRODUCTION METHOD USING A SELF-ASSEMBLING TECHNIQUE

This is a Divisional application of application Ser. No. 11/369,843, filed on Mar. 8, 2006, now U.S Pat. No. 7,547,346, which is a Continuation application of application Ser. No. 10/964,744, filed on Oct. 15, 2004, now abandoned, which is a Continuation application of application Ser. No. 09/804,299, filed on Mar. 13, 2001, now U.S. Pat. No. 6,808,568.

FIELD OF THE INVENTION

This invention concerns processes, apparatuses and systems for producing powder of extremely small, highly uniform spherical shape, having high sphericity, and composed of metal including single metals and alloys, including nanocomposite structures, using a self-assembling procedure. The present invention further includes the powder particles produced by the processes, apparatuses and systems of the present invention. The powder particles may be used for example, as the starting materials of magnets, catalysts, electrodes, batteries, heat insulators, refractory materials, and sintered metals. For instance, the powders of the rare earth-iron-boron (R—Fe—B) alloy with the nanocomposite structure of the present invention may be used a starting material for producing a sintered magnet or bonded magnet having excellent magnetic characteristics.

BACKGROUND OF THE INVENTION

Various kinds of the powders of metals, metal oxides, metal nitrides, metal silicides, and their mixed compounds have been used as the crude starting materials to produce such materials as magnets, catalysts, electrodes, batteries, heat insulators, refractory substances, and sintered metals. Such powders commonly suffer from poor uniformity of composition, shape, granularity and for spherical powders, poor sphericity (degree of roundness). A mechanical pulverization apparatus is capable of producing particles that have fine structure and are composed of more than two types of components. While of possibly uniform composition, such particles are of poor uniformity in size and shape, and of course are not of spherical shape. Moreover, it is difficult to obtain a nanocomposite structure using mechanical pulverization for the production of fine powders.

The apparatuses, systems and self assembling processes of the present invention provides for the production of very small, spherical particles having a nano-composite structure which is a particularly important embodiment of the present invention having high utility as strong permanent magnetic powders. Conventional apparatuses and methods can not result in a nanocomposite magnetic material at all, and certainly not result in the present tiny spherical powders by a self-assembly technique.

For example, materials for permanent magnet are disclosed for example in Japanese patent publication Hei 7-78269 (Japanese patent application Sho 58-94876, the patent families include U.S. Pat. Nos. 4,770,723; 4,792,368; 4,840,684; 5,096,512; 5,183,516; 5,194,098; 5,466,308; 5,645,651), which discloses (a) RFeB compounds containing R (at least one kind of rare earth element including Y), Fe and B as essential elements and having a tetragonal crystal structure with lattice constants of $a_o$ about 9 Å and $c_o$ about 12 Å, and each compound is isolated by non-magnetic phase, and (b)

RFeBA compounds containing R, Fe, B and A (A=Ti, Ni, Bi, V, Nb, Ta, Cr, Mo, W, Mn, Al, Sb, Ge, Sn, Zr, Hf, Cu, S, C, Ca, Mg, Si, O, or P) as essential elements and having a tetragonal crystal structure with lattice constants of $a_o$, about 9 Å and $c_o$ about 12 Å, and each compound is isolated by non-magnetic phase. Though this magnet shows excellent magnetic properties, the latent ability of the RFeB or RFeBA tetragonal compounds have not been exhibited fully.

U.S. Pat. No. 5,942,053 provides a composition for permanent magnet that employs a RFeB system tetragonal tetragonal compounds. This magnet is a complex of (1) a crystalline RFeB or RFeCoB compounds having a tetragonal crystal structure with lattice constants of $a_o$ about 8.8 Å and $c_o$ about 12 Å, in which R is at least one of rare earth elements, and (2) a crystalline neodymium oxide having a cubic crystal structure, wherein both crystal grains of (1) and (2) are epitaxially connected and the RFeB or RFeCoB crystal grains are oriented to the $c_o$ direction. While the resulting magnet has very good magnetic properties, no effort was made to control the nanostructure of the composition and thus the U.S. Pat. No. '053 magnet does not employ the nano-sized and non-magnetic material, neodymium oxide that is incorporated at the inside of the NdFeB ferromagnetic grains and/or at their grain boundaries as in the present invention. The U.S. Pat. No. '053 magnet does not employ the nanostructure consisting of micro-sized ferromagnetic phase and nano-sized nonmagnetic phase resulting in the nanocomposite structure of the present invention.

Conventional apparatuses for producing metal spheres include means for melting the metal and pouring the metal upon a rotating base that flings the molten metal to form spheroid particles. See JP 51-64456, JP 07-179912, JP 63-33508 and JP 07-173510. Such typical atomization apparatuses produce spherical powders having poor sphericity, limited microdimensions and poor uniformity of composition and shape. The methods and apparatuses of the present invention provide for producing particles of extremely small, highly uniform spherical shape, further providing for particles having nanocomposite structures by self-assembly of such structure.

SUMMARY OF THE INVENTION

This invention provides methods, apparatuses and systems for producing powder particles of extremely small, highly uniform spherical shape and high sphericity, composed of metal including single metals and alloys, including nanocomposite structures, using a self-assembling procedure. The invention further includes the produced powder particles.

The nanocomposite structures provide for a permanent magnet with excellent magnetic properties employing nano-sized, non-magnetic material, which is a rare earth oxide, $RO_x$, $R_2O_3$, RO, $RO_2$, such as neodymium oxide or praseodymium oxide, (or $MO_x$ where M is a minor metal as exemplified below) that is incorporated at the inside of ferromagnetic grains, such as R—Fe—B, and/or at their grain boundaries. Usually, Nd is preferably employed as R, and rare earth elements such as Pr is favorably employed. $Nd_2O_3$, RO and $RO_2$ are preferably used in the present invention. The resulting novel nanostructure consists of micro-sized ferromagnetic phase and novel nano-sized nonmagnetic phase providing for the overall novel nanocomposite structure of the present invention.

More generally, the nanocomposite metal particles in the present invention is the aggregate of nano-sized metal components separated within the particles by layers or discrete nano-sized bodies of metal oxides, metal nitrides, metal silicides, or separated by evacuated spaces, e.g. pores.

Additionally, the methods, apparatuses and systems of the present invention for produce powder of extremely small, highly uniform spherical shape and high sphericity, composed of substantially amorphous or crystalline (e.g., nanocomposites) composition, and by control of process parameters, having controlled porosity.

Thus, the products of the present invention are particles being 1) substantially crystalline; 2) substantially amorphous; or 3) of controlled porosity. The metal powders are produced by methods, apparatuses and systems wherein molten metal, alloys or composites are dropped onto a fast-rotating dish shaped disk in an atmosphere containing one or more inert gases and a small amount of oxidizing gas, and the molten metal is dispersed to be tiny droplets for a predetermined time using centrifugal force, within a cooling-reaction gas, and cooled rapidly to form spherical particles.

BRIEF DESCRIPTION OF THE DRAWINGS

FIG. 8 shows the distribution of particle sizes that resulted from the preparation of particles in accordance with Example A;

FIG. 9 shows the distribution of particle sizes that resulted from the preparation of particles in accordance with Example D;

DETAILED DESCRIPTION OF PREFERRED EMBODIMENTS

This invention provides methods, apparatuses and systems for producing powder wherein the particles are of extremely small, highly uniform spherical shape and high sphericity, composed of metal including single metals and alloys, including nanocomposite structures, using a self-assembling procedure.

The methods, apparatuses and systems of the present invention include melting and mixing the starting metal or metals, and non-metals in the case of particular composite embodiments, and directing the molten metal, alloys or composites onto a fast-rotating dish shaped disk which disperses the molten materials into tiny droplets by use of centrifugal force within a cooling-reaction gas. The surrounding atmosphere contains one or more inert gases and a small amount of an oxidizing gas. The molten metal droplets are dispersed in the surrounding gas atmosphere for a predetermined time and cooled rapidly using ejected cooling-reaction gas.

Figure 1:
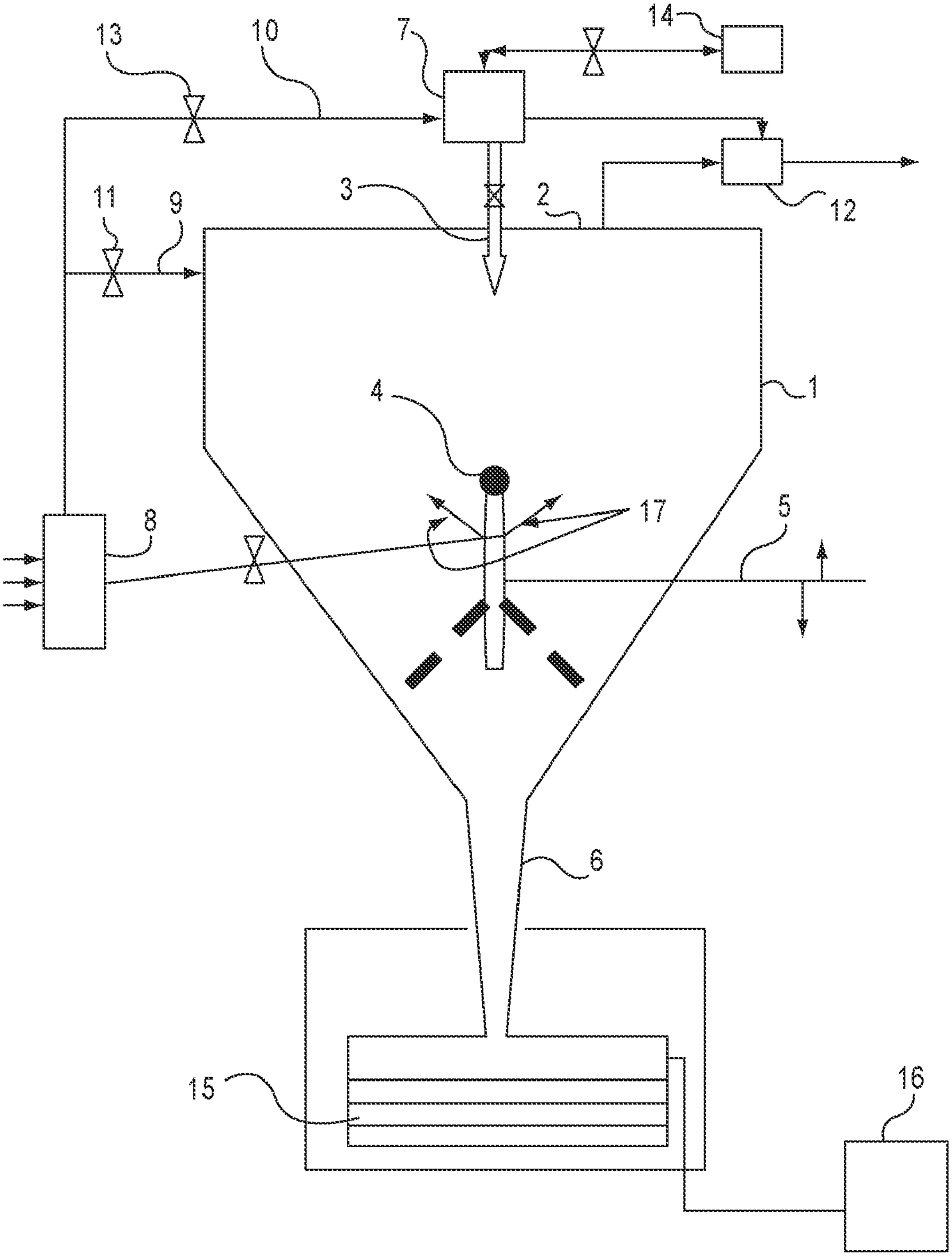
FIG. 1 shows a preferred embodiment of the system of the present invention, including the centrifugal granulation apparatus of the present invention.

A preferred embodiment of the centrifugal granulation apparatus and system of the invention is shown in FIG. 1. With reference to FIG. 1, granulation chamber 1 has an upper portion having the shape of a cylinder and a lower portion having the shape of a cone. There is a circular lid 2 seating close the granulation chamber 1. Through the lid 2 (preferably at the center), a molten metal conduit such as nozzle 3 is inserted, further having a nozzle entry end (preferably, placed perpendicularly to lid 2) so that the nozzle is inside chamber 1 and directed toward the interior of the chamber, preferably toward the center of the chamber. Beneath the nozzle 3, a rotating disk 4 (preferably dish shaped) is positioned. The line 5 on FIG. 1 indicates a mechanism for the moving the rotating dish 4 up and down to adjust the distance from the dish 4 to the nozzle 3. The cone shaped portion of chamber 1 has a wider end and a narrower end. The cone shaped portion of the chamber 1 collects the produced powder particles. The angle of the cone walls is preferably 60° and more generally from 55° to 750°. The wider end has the diameter of the cylinder shaped portion of the chamber 1. The narrow end of cone shaped portion of the granulation chamber 1 connects to an exit conduit 6 that is a conduit for the produced powder, directing the powder to a sizing filter (or screening device).

The entry end of the nozzle 3 connects to a heated vessel such as an oven 7 (preferably an electric oven such as a microwave oven). The oven 7 melts the particle starting materials, including metals and composite materials. If more than one metal starting material is to be melted then the oven 7 further includes means for thoroughly mixing the molten materials. Alternatively, mixing of particulate starting materials and/or mixing of molten metals may occur by means of a separate unit operation (device). Molten materials from oven 7 flow through the entry end of nozzle 3. Chamber 1 and oven 7 contain an atmosphere of one or more predetermined gases. Gas tank 8 is a reservoir containing the gas or mixture of gases that compose the atmosphere within chamber 1 and oven 7. Gas in tank 8 travels through conduit 9 to the chamber 1 and travels through conduit 10 to oven 7. Gas in tank 8 is also supplied by transit means to gas ejector 17 from which the gas is ejected into chamber 1, particularly within a prescribed radius of dish 4. This gas is a cooling gas for contact with and solidifying the dispersed, initially molten particles. The ejected gas further functions as a reaction gas, containing a metal reactive gas component that upon contact with the dispersed, initially molten particles, forms a coating on the surface of the particles that prevents adhesion of the particles.

The prescribed radius is a predetermined radius or cylindrical space of the centrifugal field of the rotating dish within which the molten droplets form into spherical particles.

The pressure in the granulation chamber 1 is controlled with a valve 11 regulating the gas flow through conduit 9. The pressure in the chamber 1 is also controlled by vacuum pump 12, which is connected by gas conduit means to chamber 1. The pressure of the gas in the oven 7 is controlled with a valve 13 regulating the gas flow through conduit 10. The pressure of the gas in oven 7 is also controlled by vacuum pump 14 which is connected by conduit means to oven 7. Typically, the pressure in oven 7 is set a little bit higher than the pressure in granulation chamber 1 or the pressure in the granulation chamber 1 is set a little bit lower than the pressure in oven 7. This causes the melted metals and/or other starting materials in the oven 7 to flow in a predetermined amount from the nozzle 3, so as to drop a prescribed distance to the rotating dish 4 due to the difference of the pressures and gravity. The dropped molten metal or metal composite is dispersed into tiny droplets due to the centrifugal force of the rotating dish 4. The droplets are rapidly cooled to become solid powder principally by encountering the flow of gas from the gas ejector 17. The produced powder is collected by the cone shaped portion of the chamber 1 and conducted through exit conduit 6 to filter (screening apparatus) 15 which allows particles of a prescribed size to pass through to powder collection chamber 16. Particles that are rejected by filter 15 may be collected from the filter or alternatively recycled to oven 7.

With respect to certain features of the above described apparatus, the shape of the rotating target disk is preferably the referenced dish 4 of FIG. 1. Testing has shown that if the rotating target is a flat disk or a cone, the resulting particles have less sphericity. The use of a dish shaped target results in particles having a spherical shape of almost perfect roundness, wherein the sphericity deviates by about 10% from the shape of a perfect sphere. Moreover, the use of a dish shaped target contributes to uniform spherical shape, wherein greater than or equal to 60-70% (typically about 65%) of the resulting particles have a true spherical shape of less than or equal to ±10%. A preferred dish may has a diameter of 35 mm and a depth of 5 mm. The dish has a generally flat to slight slope toward upwardly flaring sides. The 5 mm is measured from the center of the dish to the height of the upwardly flaring sides. More generally, the dish may be 30-50 mm in diameter. The depth of the dish is generally 10-18% of the diameter of the dish.

If the dish target has the shape of a flat disk or a cone, then the resulting particles have less sphericity. The cone shaped target results in greater damage to the sphericity of the resulting particles. The flat disk target does not provide sufficient loft to the particles and thus insufficient time for the particles to be in the surrounding gas, resulting in degraded particle sphericity. Other operational parameters contribute to the uniform shape and sphericity of the resulting particles.

A further advantage of the preferred dish shape of the rotating target disk 4, in FIG. 1, is that the molten drops of starting metals/composite components may be ejected and drop from nozzle 3 to land almost anywhere on the upper surface of the disk and result in highly uniform spheres having high sphericity. This is due to the flat to slight angle of the upper surface of the dish which extends from the center outwards to meet the upwardly flaring side portion of the dish. The molten metal flows from nozzle 3 at a preferable rate of 0.72 Kg/min and more generally from 0.5 to 0.9 Kg/min. The distance from nozzle 3 to the rotating disk 4 is preferably 120 cm and more generally from 90 to 150 cm.

The methods of the present invention include the following steps:

melting and thoroughly mixing starting metals/composite materials in the presence of an atmosphere of gas selected from the group consisting of argon, helium and oxygen;

ejecting the molten materials by pressure or gravity to drop onto a spinning disk within an atmosphere which is the same as the gas present when melting and mixing the starting materials, wherein the pressure of the atmosphere surrounding the spinning disk is slightly less than the pressure present during melting and mixing the starting materials;

dispersing the molten starting materials within a space containing a centrifugal field by a centrifugal force created by the spinning disk to form tiny droplets having a trajectory being initially lateral, during which time the droplets form into spheres; and cooling the dispersed droplets to form solid spheres by contact with a cooling gas mixture ejected into the dispersion space, the gas mixture being of the same types of gases as in the atmosphere gas surrounding the spinning disk and present during melting and mixing the starting materials.

The trajectory of the dispersed tiny droplets is within a centrifugal field wherein the tiny droplets have sufficient initial speed to travel through sufficient cooling gas to solidify into spheres before falling out of the dispersion-cooling centrifugal space. The initial lateral trajectory of the dispersed particles is sufficient to solidify the droplets and the trajectory ranges from 50 to 150 cm.

The spinning disk rotates at high speed ranging from 50,000 to 100,000 rpm. Such speeds may be attained for example by using an electric motor employing an electromagnetic "bearings" spindle, as commercially available. The diameter of the spinning disk and the rotational speed of the disk both contribute to the centrifugal effect on the dispersed droplets. A measure of this effect is the product of the disk diameter and the rotational speed of the disk. Thus, a 30 mm diameter disk rotating at 50,000 rpm results in 1,500,000 rpm-mm. A 30 mm diameter disk rotating at 100,000 rpm results in 3,000,000 rpm-mm. A 40 mm diameter disk rotating at 50,000 rpm results in 2,000,000 rpm-mm.

In order to obtain particles with an average diameter of less than 200 μm, it is preferable to use a dish shaped spinning disk having a diameter of 35 mm with center depth of 5 mm and rotating at 1,500,000 rpm-mm. The preferable range of produced spherical particles is 15-300 μm±1% in diameter. However, may be produced in the range of 1-20 μm±1% in diameter.

In general, a spinning disk rotation of 1,000,000 rpm-mm produces spherical particles of less than or equal to 300 μm. A spinning disk rotation of 1,500,000 rpm-mm produces spherical particles of 100 to 200 μm. A spinning disk rotation of 3,000,000 rpm-mm produces spherical particles of 1 to 20 μm.

The sphericity of the resulting particles is exceptionally high, being less than or equal to ±10%. Furthermore, the uniformity of produced spherical particles is exceptionally high, being greater than or equal to 65% having identical sphericity.

In general, the faster the rotation speed of the spinning disk, the smaller the size of the resulting spherical particles. This is subject to adjustment of process parameters such as composition, pressure and temperature of the atmosphere gas outside the centrifugal field, gas flow rate of the ejected cooling gas, gas composition, pressure and temperature within the centrifugal field, and other parameters as will be more fully described further below. Significantly, the proportion of particle constituents, whether simple two metal alloy to complex nanocomposite, are uniformly the same less than or equal to 1%, in all the particles and reflects the same proportion of constituents as in the starling materials.

The temperature of the atmosphere gas supplied in the chamber 1 can be room temperature. However, the temperature in the chamber should be less than 100° C. in order to have rapid cooling of the dispersed metal droplets. The cooling-reaction gas supplied by ejector 17 has a preferred temperature of about 20° C. and more generally a temperature of 10° to 30° C.

The atmosphere gas present for melting starting materials, within the granulation chamber and in the cooling-reaction gas is composed of inert gases, such as Ar, Ne and/or He, and an oxidizing gas, such as oxygen. The preferred inert gases are Ar and He. The preferred oxidizing gas is oxygen. The atmosphere gas is almost entirely composed of inert gas or mixture of inert gases, and the oxidizing gas is present in very small quantity, in a preferred amount of 1.0 ppm and more generally from 0.5 to 1.5 ppm.

The ejected cooling-reaction gas preferably contains the same gas components as the atmosphere gas, contacts with and solidifies the dispersed, initially molten particles. The ejected gas further functions as a reaction gas, containing a metal reactive gas component, such as the above described, preferred oxidizing gas. Upon contact with the dispersed, initially molten particles, the oxidizing component of the cooling-reaction gas forms a coating on the surface of the particles that prevents adhesion of the particles. The ejected cooling-reaction gas generally contains the same gas components as the atmosphere gas but may differ within the range of 0.5 to 1.5 ppm in controlling the amount of coating formed upon the particles.

The products of the present methods are tiny, almost perfect spherical particles having a composition that is 1) crystalline, 2) amorphous, or 3) porous. The process parameters of the present methods are adjusted to produce the desired type of composition.

Of particular importance are the generally crystalline compositions that include nanocomposites. The nanocomposite metal particles of the present invention are the aggregate of nano-sized metal components separated within the particles by layers or discrete nano-sized bodies of metal oxides, metal nitrides, metal silicides, or separated by evacuated spaces, e.g. pores. The structure of such nanocomposites is complex and the methods of the present invention uniquely result in the self-assembly of such structures. Of greatest interest is the use of such nanocomposites as strong permanent magnets.

The composition for a permanent magnet having excellent magnetic properties, employs nano-sized and non-magnetic material, which is a rare earth oxide, $RO_x$, $R_2O_3$, RO, $RO_2$, such as neodymium oxide or praseodymium oxide, (or $MO_x$, where M is a minor metal as exemplified below) that is incorporated at the inside of ferromagnetic grains, such as R—Fe—B, and/or at their grain boundaries. Usually, Nd is preferably employed as R, and rare earth elements such as Pr is favorably employed. $Nd_2O_3$, RO and $RO_2$ are preferably used in the present invention. The resulting novel nanostructure consists of micro-sized ferromagnetic phase and novel nano-sized nonmagnetic phase providing for the overall novel nanocomposite structure of the present invention.

A strong permanent magnet, having high magnetic energy $(BH)_{max}$ for a rare earth (R)—Fe—B single crystal such as $Nd_2Fe_{14}B$, was developed by controlling the nanostructure through in-situ reaction during melting and formation of the present spheres under predetermined process conditions. In this process, oxygen, which is conventionally avoided as an impurity in magnetic materials, was positively introduced as a reforming agent in a form of metal oxide. Consequently, in the case of $Nd_2Fe_{14}B$, the nano-sized and non-magnetic material, neodymium oxide, was incorporated at the inside of the $Nd_2Fe_{14}B$ ferromagnetic grains and/or at their grain boundaries. This nanostructure, consisting of micro-sized ferromagnetic phase and nano-sized nonmagnetic phase, is a nanocomposite structure. Such structures are know in ceramic-based composite materials, however, are new in the production of permanent magnetics.

In the nanocomposite spherical magnets of the present invention, the matrix of the composition is a rare earth-ferromagnetic material, typically a RFeB or RFeCoB system. R is one or more of the rare earth elements, including La, Ce, Pr, Nd, Pm, Sm, Eu, Gd, Tb, Dy, Ho, Er, Tm, Yb and Lu.

In one embodiment of the present invention, the ferromagnetic composition is expanded to include $R^1_{2-x}R^2_xFe_{bal}Co_yM_z$ (and may further include a third rare earth metal, $R^3_x$ that is to say, $R^1_{2-x}R^2_xR^3_xFe_{bal}Co_yM_z$) M is minor metal elements (Ba, Ca, Mg, Sr, Be, Bi, Cd, Co, Ga, Ge, Hf, In, B, Si, Mn, Mo, Re, Se, Ta, Nb, Te, Tl, Ti, W, Zr and V), x=0-0.3, y=0-0.3 and z=0-0.1. As a starting material, this composition may contain, for example three rare earth elements, and has the following formula: $Dy_xNd_{2-x}Pr_xFe_{bal}Co_yB_z$, x=0-0.3, y=0-0.3 and z=0-0.1.

In preparing the composition of the present invention, to obtain localized precipitation of R oxide ($RO_x$, x=1 to 3), e.g., Nd oxide ($NdO_x$, x=1 to 3) the oxygen is provided by the surrounding gas atmosphere (starting material melting vessel and granulation chamber) in the present process.

In the present invention the melted metals and composite materials were self-assembled upon 1) dispersing and 2) the rapid cooling afforded principally by the ejected cooling (−reaction) gas, resulting in metal spheres which have high sphericity, high uniformity (being mostly equal in size) and quality with the nanocomposite structure. The nanocomposite metal particles of the present invention are the aggregate of nano-sized metal components separated within the particles by layers or discrete nano-sized bodies of metal oxides, metal nitrides, metal silicides, or separated by evacuated spaces, e.g. pores. The self-assembling aspect of the present invention means that the melted metals form the nano-composite structure automatically in the process of dispersing and rapid cooling.

Thus, one embodiment of the process of the present invention for producing extremely small metal spherical particles having a crystalline composition and of high uniform size and high sphericity, comprises the following steps:

melting metal starting materials;

dispersing said molten metal starting materials into tiny spherical droplets by directing the molten metal upon a rotating disk, wherein the surrounding atmosphere has a concentration of 0.3 to 0.7 ppm oxygen;

cooling said dispersed metal droplets by directing a cooling-reaction gas to contact the dispersed metal spherical droplets and thus solidify the droplets into tiny spherical particles and form an anti-adhesion coating on the particles.

In this process, further embodiments include the following:

1) the dispersing of the molten material into droplets occurs in a surrounding temperature of 10-150° C.
2) the dispersing of the molten material into droplets occurs in a degree of vacuum that is −0.04 Mpa.
3) the dispersing of the molten material into droplets occurs in a gas atmosphere of Ar further containing 0.3 to 0.7 ppm oxygen.

4) in the cooling of the dispersed droplets, the cooling gas is ejected with a flow rate of 1 L/min±10%.
5) the cooling-reaction gas contains Ar and 0.8-1.2 ppm oxygen.
6) the cooling-reaction gas has a gas pressure of 0.5 MPa±10%.
7) the temperature of the cooling-reaction gas is 10-30° C.
8) in the dispersing of the molten metal, the gas pressure is −0.06 to −0.02 MPa.
9) in the dispersing of the molten metal, the external gas pressure at the periphery of the dispersed droplets is atmospheric, 14.696 psi±1%).

One embodiment of the process of the present invention for producing extremely small metal spherical particles having an amorphous composition and of high uniform size and high sphericity, comprises the following steps:

melting metal starting materials;

dispersing said molten metal starting materials into tiny spherical droplets by directing the molten metal upon a rotating disk, wherein the surrounding atmosphere has a temperature of 10-30° C.;

cooling said dispersed metal droplets by directing a cooling-reaction gas to contact the dispersed metal spherical droplets and thus solidify the droplets into tiny spherical particles and form an anti-adhesion coating on the particles.

In this process, further embodiments include the following:
1) the dispersing of the molten material into droplets occurs in a degree of vacuum that is −0.05 Mpa.
2) the dispersing of the molten material into droplets occurs in a gas atmosphere of Ar, further containing 180 to 220 ppm helium and 0.3 to 0.7 ppm oxygen.
3) in the cooling of the dispersed droplets, the cooling gas is ejected with a flow rate of 3 L/min±10%.
4) the cooling-reaction gas contains Ar, further containing 180 to 220 ppm helium and 0.8-1.2 ppm oxygen.
5) the cooling-reaction gas has a gas pressure of 0.5 MPa±10%.
6) the temperature of the cooling-reaction gas is 10-30° C.
7) in the dispersing of the molten metal, the gas pressure is −0.06 to −0.02 MPa.
8) in the dispersing of the molten metal, the external gas pressure at the periphery of the dispersed droplets is about atmospheric, 14.696 psi±1%.

One embodiment of the process of the present invention for producing extremely small metal spherical particles having a porous composition and of high uniform size and high sphericity, comprises the following steps:

melting metal starting materials;

dispersing said molten metal starting materials into tiny spherical droplets by directing the molten metal upon a rotating disk, wherein the surrounding atmosphere has a concentration of 0.8 to 1.2 ppm oxygen;

cooling said dispersed metal droplets by directing a cooling-reaction gas to contact the dispersed metal spherical droplets and thus solidify the droplets into tiny spherical particles and form an anti-adhesion coating on the particles.

In this process, further embodiments include the following:
1) the dispersing of the molten material into droplets occurs in a surrounding temperature of 10-150° C.
2) the dispersing of the molten material into droplets occurs in a degree of vacuum that is about atmospheric pressure, 14.696 psi±1%.
3) the dispersing of the molten material into droplets occurs in a gas atmosphere of Ar further containing 0.8 to 1.2 ppm oxygen.
4) in the cooling of the dispersed droplets, the cooling gas is ejected with a flow rate of 1 L/min±10%.
5) the cooling-reaction gas contains Ar and 0.8-1.2 ppm oxygen.
6) the cooling-reaction gas has a gas pressure of 0.5 MPa±10%.
7) the temperature of the cooling-reaction gas is 10-30° C.
8) in the dispersing of the molten metal, the gas pressure is about atmospheric, 14.696 psi±1%.
9) in the dispersing of the molten metal, the external gas pressure at the periphery of the dispersed droplets is +0.01 to +0.03 MPa.

Embodiments of the present invention will be described in the following examples, however, the present invention is not to be limited in any way to the examples.

For instance while below Example C demonstrates the preparation of spherical particles of a bimetal alloy having a porous character, the methods and apparatuses of the present invention produce spherical particles composed of substantially amorphous metal or crystalline composites, e.g., nanocomposites, and by control of process parameters, they may also be prepared to have controlled porosity.

EXAMPLES

Three test examples of the present invention and one comparison example were prepared:

Example A shows the preparation and characteristics of spherical particles of the present invention having a generally crystalline character.

Example B shows the preparation and characteristics of spherical particles of the present invention having a generally amorphous character.

Example C shows the preparation and characteristics of spherical particles of the present invention having a generally porous character.

Example D shows the preparation and characteristics of spherical particles using a conventional atomizing apparatus and method having a generally crystalline character.

Example A

Example A resulted in the preparation of the nanocomposite spherical particles of the present invention having the formula: $Nd_2Fe_{14}B—NdO_x$ (x=1-3). This is representative of a rare earth-iron-boron alloy (R—Fe—B where R is rare earth metal).

Using the apparatus and system shown in FIG. 1 and described above, starting metals of Nd, Fe and B were melted and thoroughly mixed under an atmosphere of Ar and 1 ppm oxygen ("O"). The temperature inside granulation chamber 1 could vary from 10-150° C. The molten Nd, Fe, B mixture was dropped from the ejector 3 onto the rotating disk 4, having a dish shape with diameter of 30 mm and center depth of 5 mm. The rotation of the dish was 100,000 rpm. Within the chamber, the degree of vacuum was −0.04 MPa and the oxygen content of the Ar, O atmosphere was 0.5 ppm. The ejected cooling gas was Ar and O, being ejected at a rate of 1 L/min 10%. The gas is Ar with 1 ppm O±10%. The cooling gas temperature was 10-30° C. and the pressure of the cooling gas near the ejector was 0.5 MPa±10%. The gas pressure within the dispersion, centrifugal field was −0.06 to −0.02 MPa and at the periphery of the centrifugal field, the pressure was atmospheric pressure (14.696 psi±1%). The cooling gas further acts as a reaction gas by providing an additional oxygen source for forming the $NdO_x$ of the resulting nanocomposite particles. The dispersed droplets were rapidly cooled in the centrifugal field with the cooling gas to be tiny spherical particles having a nanocomposite composition. Table 1 lists the process parameters of Example A.

Figure 2A:
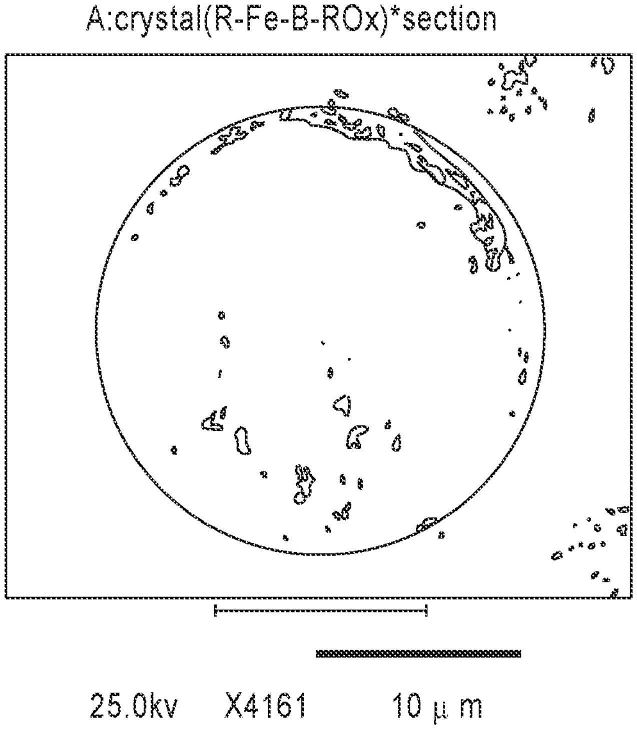
FIGS. 2A and 2B show scanning electron microscope (SEM) images of the powder particles (cross section size of about 20 μm diameter) respectively produced according to Example A (crystalline (nanocomposite) spherical particles) and Example D (conventional metal spherical particles)

The resulting spherical particles were of 15 μm in diameter. The scanning electron microscope (SEM) image of FIG. 2A shows a cross section of a resulting Example A particle. The particle has nearly perfect sphericity (the particles as a whole deviating by less than 10% from the shape of a perfect sphere) and the cross section demonstrates the nanocrystalline structure inside the particle. The constituents within the nanocrystalline structure have sizes on the order of 0.015 μm which are nano-sized. The nanostructure was produced by self assembling inside during the dispersion and cooling of the molten metal droplets. The aggregate of nano-sized metal components within the particle are Nd, Fe, B and $NdO_x$ (x=1-3). While the starting materials were Nd, Fe and B, the $NdO_x$ formed, homogeneously mixed with the Nd, Fe and B within the particles, during the self assembly process.

The uniformity of spherical size is high as shown by the data of FIG. 8. In FIG. 8 under the subheading of "Difference value" there is a high percent of particles for any measured "Particle diameter." Thus, there is a very high proportion of spherical particles being about the same diameter.

Figure 6:
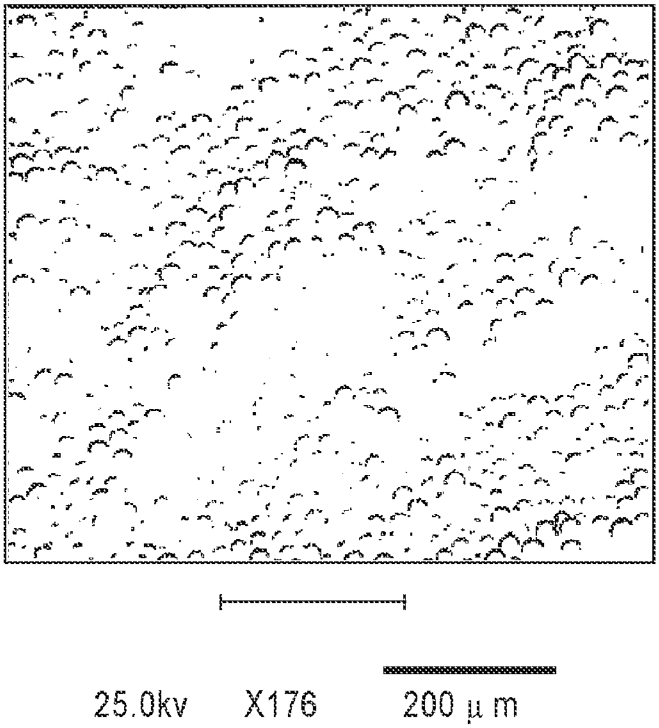
FIG. 6 shows a scanning electron microscope (SEM) image at 176× magnification, of a plurality of nanocomposite particles (R—Fe—B—$RO_x$) produced by the apparatus/system/method of the present invention in accordance with Example A.
Figure 7:
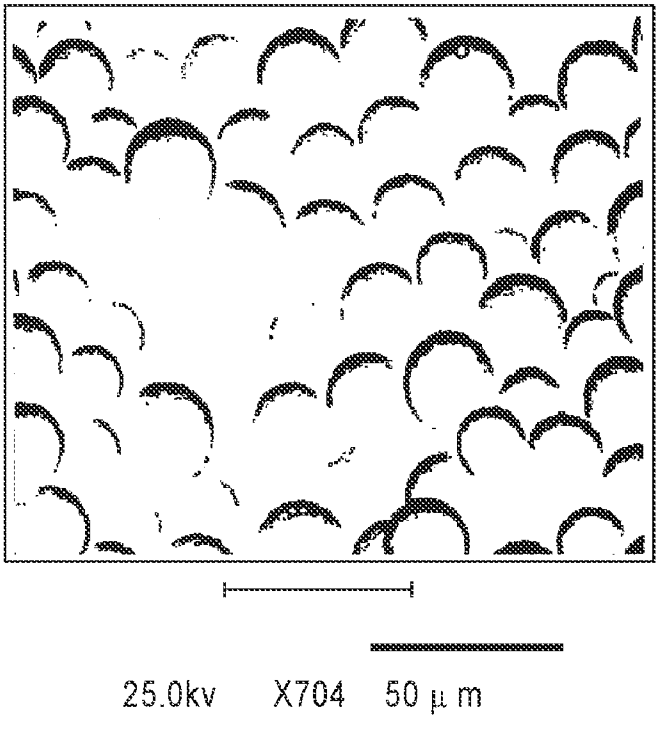
FIG. 7 shows a scanning electron microscope (SEM) image at 704× magnification, of a plurality of nanocomposite powder particles (R—Fe—B—$RO_x$) produced by the apparatus/system/method of the present invention in accordance with Example A.
Figure 10:
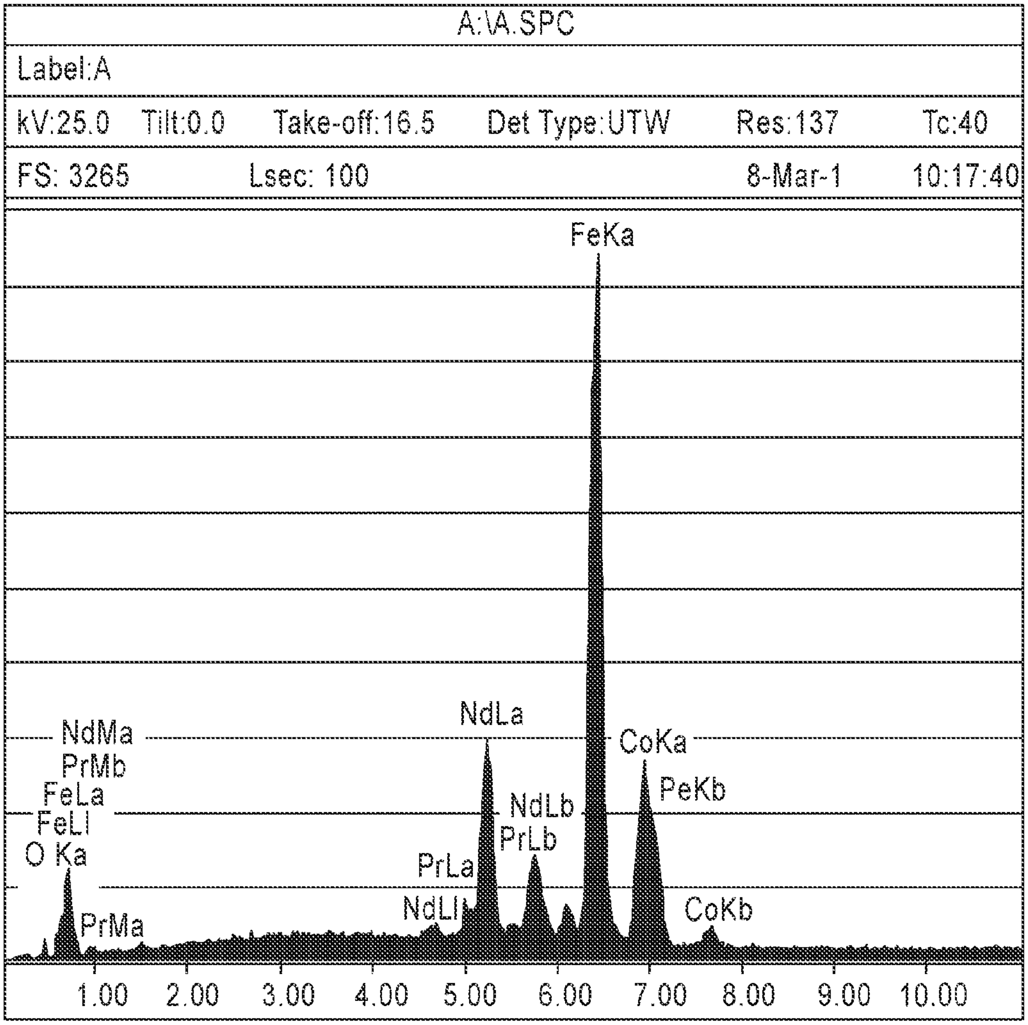
FIG. 10 shows EDAX ZAF Quantification data for the particles produced from Example A.
Figure 11:
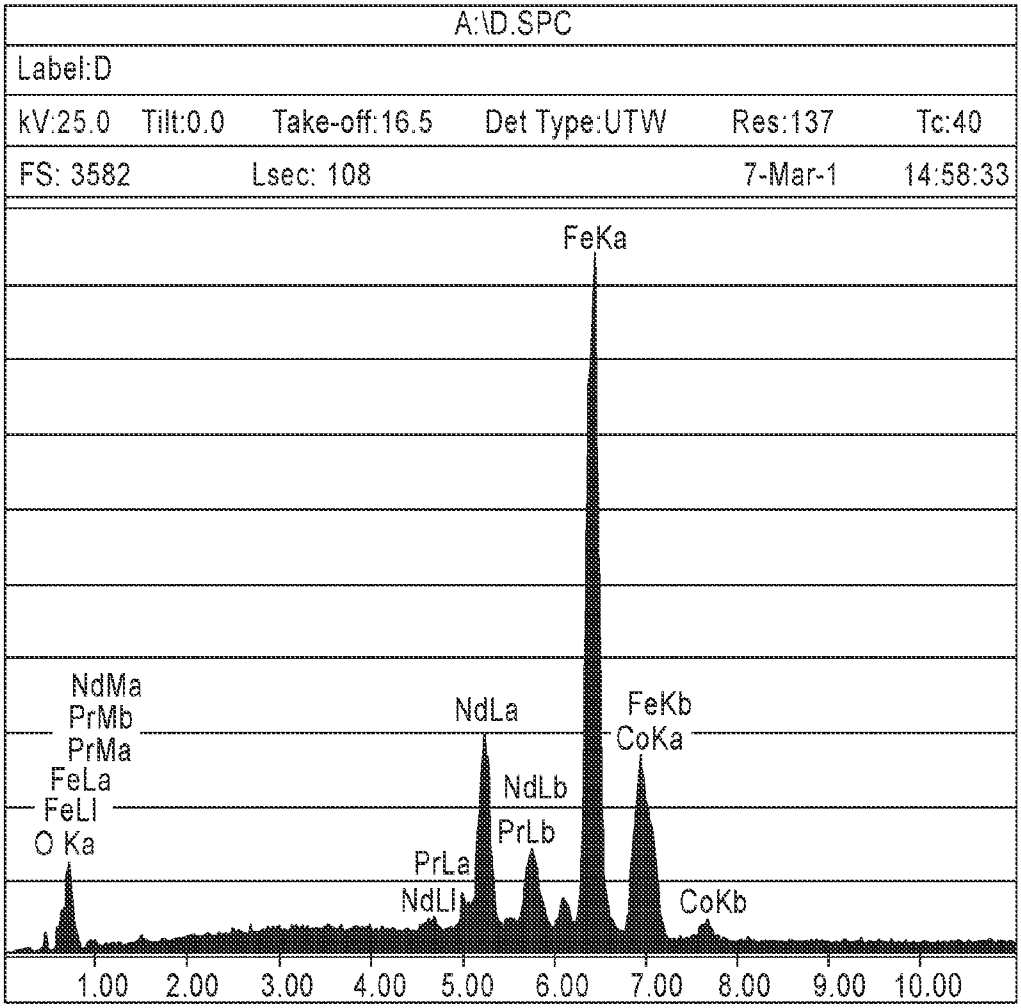
FIG. 11 shows EDAX ZAF Quantification data for the particles produced from Example D.

The high degree of sphericity and high uniformity of spherical shape (high proportion having the same spherical shape) are further shown in the scanning electron microscope (SEM) images of FIG. 6 (176× magnification) and FIG. 7 (704× magnification).

Example B

Example B resulted in the preparation of the amorphous spherical particles of the present invention which may be composed of almost any metal or metal alloy. Such metals preferably include by means of example only: Fe, Ni, Sn, Ti, Cu and Ag with combinations of Ni—Al, Sn—Ag—Cu, B—Fe—Nd (and its variations) and Al—Ni—Co—Fe. More generally, the metals for purposes of example only, include the following and include combinations thereof: Ag, Cu, Ni, Al, Ti, V, Nb, Cr, Mo, Mn, Fe, B, Ru, Co, Pd, Pt, Au, Zn, Cd, Ga, In, Ti, Ge, Sn, Pb, Sb, Bi, Ce, Pr and Nd.

In present Example B, spherical particles were prepared having an amorphous composition of silver, i.e. Ag.

Using the apparatus shown in FIG. 1 and described above, starting metal of Ag was melted under an atmosphere of Ar and 200 ppm helium and 1 ppm oxygen ("O"). The temperature inside granulation chamber 1 could vary from 10-30° C. The molten Ag was dropped from the ejector 3 onto the rotating disk 4, having a dish shape with diameter of 30 mm and center depth of 5 mm. The rotation of the dish was 100,000 rpm. Within the chamber, the degree of vacuum was −0.05 MPa and the oxygen content of the Ar, He, O atmosphere was 0.5 ppm. The ejected cooling gas was Ar, He and O, being ejected at a rate of 3 L/min±10%. The cooling gas was Ar with 200 ppm He±10% and 1 ppm O±10%. The cooling gas temperature was 10-30° C. and the pressure of the cooling gas at the ejector was 0.5 MPa±10%. The gas pressure within the dispersion, centrifugal field was −0.06 to −0.02 MPa and immediately beyond the centrifugal field, the pressure was atmospheric pressure (14.696 psi±1%). The dispersed droplets were rapidly cooled in the centrifugal field by the cooling gas to be tiny spherical particles having an amorphous composition. Table 1 lists the process parameters of Example B.

Figure 3A:
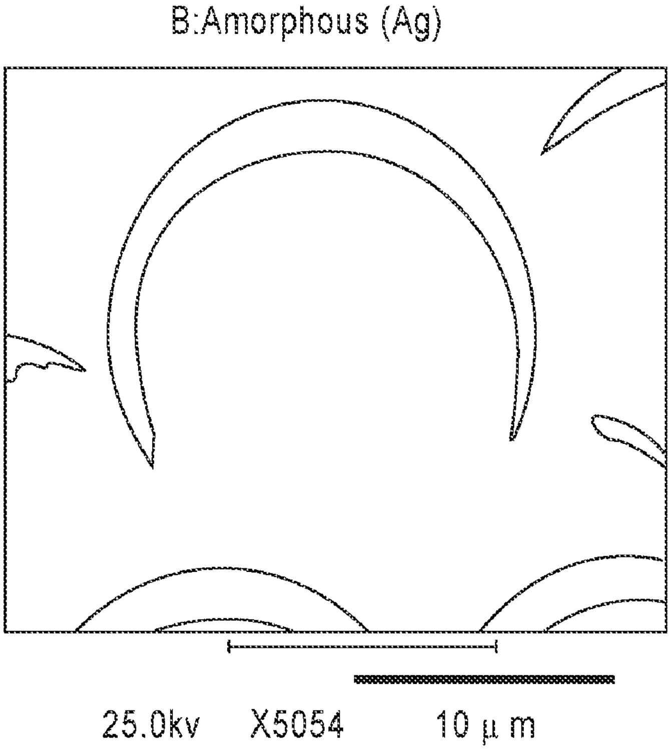
FIGS. 3A and 3B show scanning electron microscope (SEM) images of the powder particles respectively produced according to Example B (amorphous metal particles) and Example C (porous metal particles)
Figure 3B:
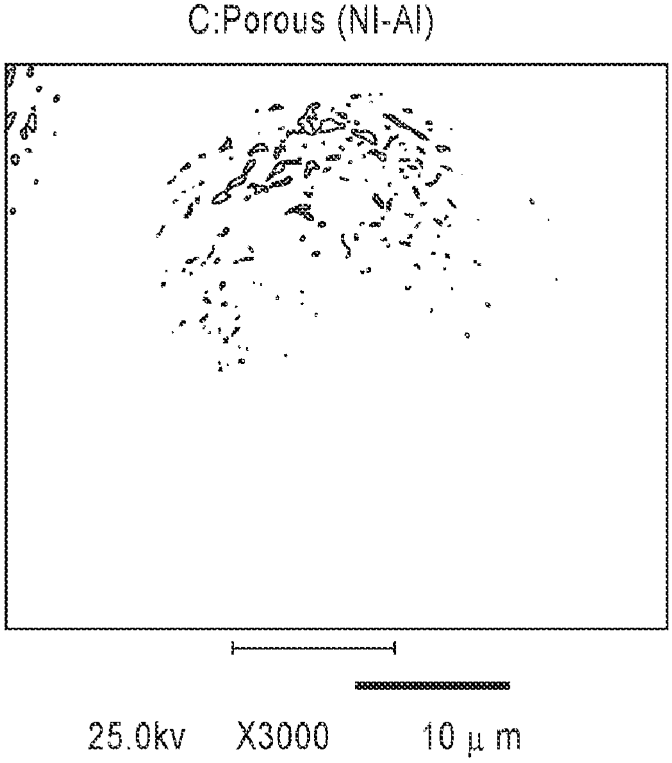

The resulting spherical particles were of 15 μm in diameter. The scanning electron microscope (SEM) image of FIG. 3A shows a resulting Example B particle. The amorphous Ag particle has nearly perfect sphericity (the particles as a whole deviating by less than 10% from the shape of a perfect sphere).

Example C

Example C resulted in the preparation of the porous spherical particles of the present invention which may be composed of almost any metal or metal alloy. Such metals include by means of example only: Fe, Ni, Sn, Ti, Cu and Ag with combinations of Ni—Al, Sn—Ag—Cu, B—Fe—Nd (and its variations) and Al—Ni—Co—Fe. More generally, the metals for purposes of example only, include the following and include combinations thereof: Ag, Cu, Ni, Al, Ti, V, Nb, Cr, Mo, Mn, Fe, B, Ru, Co, Pd, Pt, Au, Zn, Cd, Ga, In, Ti, Ge, Sn, Pb, Sb, Bi, Ce, Pr and Nd.

In present Example C, spherical particles were prepared having a porous composition of 50% by weight nickel and 50% by weight aluminum (i.e. Ni—Al).

Using the apparatus and system shown in FIG. 1 and described above, starting metals of 50% by weight nickel and 50% by weight aluminum were melted and thoroughly mixed under an atmosphere of Ar and 1 ppm oxygen ("O"). The temperature inside granulation chamber 1 could vary from 10-150° C. The molten Ni—Al was dropped from the ejector 3 onto the rotating disk 4, having a dish shape with diameter of 30 mm and center depth of 5 mm. The rotation of the dish was 100,000 rpm. Within the chamber, the degree of vacuum was 1 atm (14.696 psi) and the oxygen content of the Ar, O atmosphere was 1 ppm. The ejected cooling gas was Ar and O, being ejected at a rate of 1 L/min±10%. The cooling gas was Ar with 1 ppm O±10%. The cooling gas temperature was 10-30° C. and the pressure of the cooling gas at the ejector was 0.5 MPa±10%. The gas pressure within the dispersion, centrifugal field was atmospheric pressure (14.696 psi±1%) and immediately beyond the centrifugal field, the pressure was +0.01 to +0.03 MPa. The dispersed droplets were rapidly cooled in the centrifugal field by the cooling gas to be tiny spherical particles having a porous composition. Table 1 lists the process parameters of Example C.

The resulting spherical particles were of 30 μm in diameter. The scanning electron microscope (SEM) image of FIG. 3A shows a resulting Example C particle. Despite the rough exterior due to the porous character of the composition, the porous Ni—Al particle has nearly perfect sphericity (the particles as a whole deviating by less than 10% from the shape of a perfect sphere).

Example D (Comparison Example)

Example D resulted in the preparation of spherical particles having the formula, $Nd_2Fe_{14}B$—$NdO_x$ (x=1-3), using the conventional atomization process described in Japan Patent Publication No. 07-179912 (Application No. 05-354705) which is incorporated by reference in its entirety. This is representative of spherical particles composed of a rare earth-iron-boron alloy (R—Fe—B where R is rare earth metal) that are produced by a conventional atomization process for preparing spherical particles. Present Example D is directly comparable to Example A which demonstrates the present invention.

Using the apparatus and process described in the aforementioned Japan Patent Publication No. 07-179912, starting metals of Nd, Fe and B were melted together in an oven. The temperature inside atomization chamber 1 could vary from 10-150° C. The molten Nd, Fe, B mixture was dropped from the oven onto a rotating disk 4 having a diameter of 30 mm.

The rotation of the disk was 100,000 rpm. Within the chamber, the degree of vacuum was −0.04 MPa and the atmosphere was normal air.

The apparatus and method of JP 07-179912 does not include a cooling gas nor cooling gas ejector.

recognize that there are many possible variations and modifications which may be made in the exemplary embodiments while yet retaining many of the novel and advantageous features of this invention. Accordingly, it is intended that the following claims cover all such modifications and variations.

TABLE 1

| | | | | |
|---|---|---|---|---|
| A: crystal | , dish | 30 mm | 100000 rpm |
| B: amorphous | , dish | 30 mm | 100000 rpm |
| C: porous | , dish | 30 mm | 100000 rpm |
| D: nomal | , dish | 30 mm | 100000 rpm |

| | jet gas | type of gases | reaction gas | gas pressure | gas temperature |
|---|---|---|---|---|---|
| A: crystal | 1 L/min | Ar + O | O: 1 ppm | 0.5 MPa | 10~30 C. |
| B: amorphous | 3 L/min | He + Ar + O | He: 200 ppm<br>O: 1 ppm | 0.5 MPa | 10~30 C. |
| C: porous | 1 L/min | Ar + O | O: 1 ppm | 0.5 MPa | 10~30 C. |
| D: nomal | NO. | NO. | NO. | NO. | NO. |

| | in a chamber (within a centrifugal field) | | |
|---|---|---|---|
| | internal pressure | central pressure | external pressure (radius 1.5~2 m) |
| A: crystal | | '−0.06~−0.02 MPa' | under atmospheric pressure |
| B: amorphous | | '−0.06~−0.02 MPa' | under atmospheric pressure |
| C: porous | | under atmospheric pressure | '+0.01~+0.03 MPa' |
| D: nomal | | '−0.06~−0.02 MPa' | under atmospheric pressure |

The gas pressure within the dispersion, centrifugal field was −0.06 to −0.02 MPa and immediately beyond the centrifugal field, the pressure was atmospheric pressure (14.696 psi±1%). Table 1 lists the process parameters of Example D.

Figure 2B:
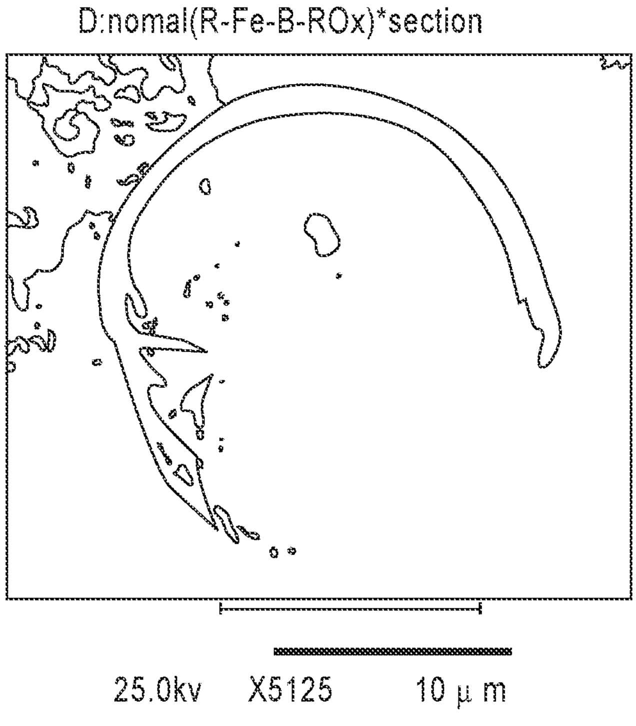

The resulting spherical particles were of 15 μm in diameter. The scanning electron microscope (SEM) images of FIG. 2B shows a cross section of a resulting Example D particle. The particle has noticeably poor sphericity and the cross section demonstrates no nanocrystalline structure inside the particle. The constituents within the particle have the expected mix of Nd, Fe and B. The $NdO_x$ (x=1-3) has only formed as an outer coating on the particle with the formation of no $NdO_x$ inside the particle.

The uniformity of spherical size is poor as shown by the data of FIG. 9. In FIG. 9 under the subheading of "Difference value" there is a low percent of particles for any measured "Particle diameter." Thus, there is a low proportion of spherical particles being about the same diameter.

Figure 4:
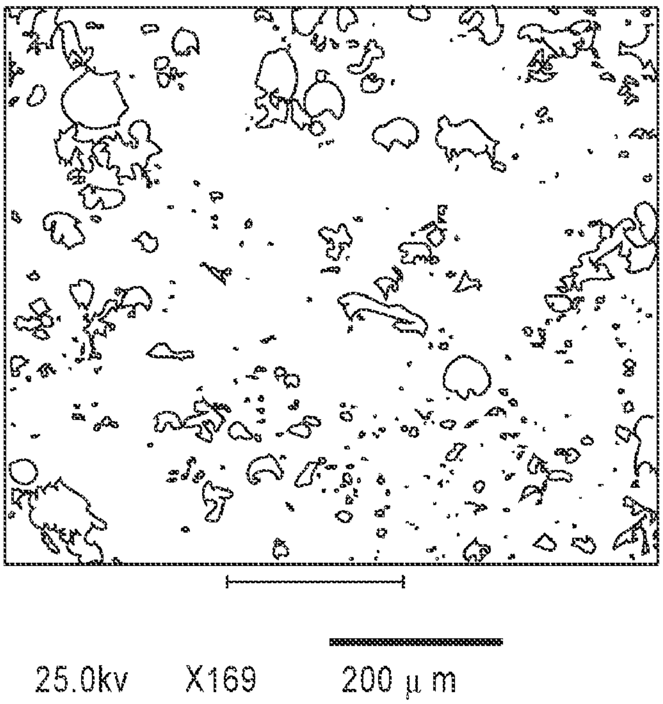
FIG. 4 shows a scanning electron microscope (SEM) image at 169× magnification, of a plurality of particles (R—Fe—B—$RO_x$) produced by a conventional centrifugal atomization apparatus/method in accordance with Example D.
Figure 5:
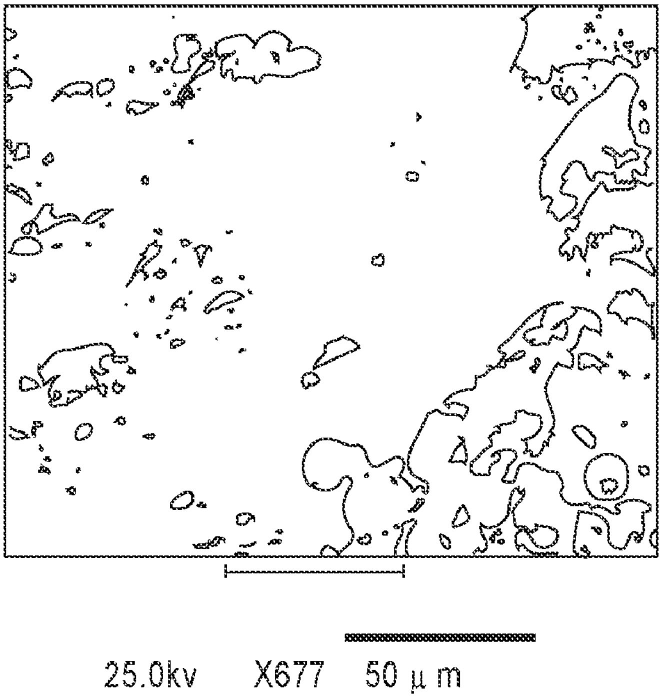
FIG. 5 shows a scanning electron microscope (SEM) image at 677× magnification, of a plurality of particles (R—Fe—B—$RO_x$) produced by a conventional centrifugal atomization apparatus/method in accordance with Example D.

The low degree of sphericity and low uniformity of spherical shape (low proportion having the same spherical shape) are further shown in the scanning electron microscope (SEM) images of FIG. 4 (169× magnification) and FIG. 5 (677× magnification).

A comparison of Example A particles shown in FIG. 6 shows that the spherical particles are practically equal in size while the Example D particles shown in FIG. 4 show particles that are not equal in size. A comparison of Example A particle data presented in FIG. 8 with the Example D particle data presented in FIG. 9 show that the spherical particles of Example A are practically equal in size while the Example D particles are not particularly equal in size.

A comparison of Example A particles shown in FIG. 7 shows that the spherical particles are nearly perfect spheres having very high sphericity while the Example D particles shown in FIG. 5 show particles having poor sphericity.

While only a few exemplary embodiments of this invention have been described in detail, those skilled in the art will

What is claimed is:

1. A system for producing extremely small metal spherical particles of high uniform size and high sphericity comprising:

a granulation chamber being gas substantially tight and having an upper end and a lower end, the granulation chamber being in a vacuum atmosphere;

means for collecting produced particles at the lower end of the chamber with a particle conduit means for delivering produced particles from the chamber;

conduit means for delivering molten metal through said upper end of the granulation chamber, said conduit means protruding through the upper end so that said protruding conduit means is directed down toward the interior of the chamber;

a heated vessel being substantially gas tight and adapted for melting metal starting materials and which connects to said molten metal conduit means, allowing the flow of molten metal from the heated vessel through said molten metal conduit means;

a rotating disk located beneath said protruding molten metal conduit means which disperses molten metal that drops upon said disk from said protruding molten metal conduit means to form tiny dispersed droplets, the rotating disc being provided in the granulation chamber, the rotating disc rotating at 50,000 rpm to 100,000 rpm using a motor under the vacuum atmosphere; and ejector means for ejecting cooling gas within a predetermined radius of said rotating disk to cool said dispersed metal droplets into solidified metal spheres.

2. The system of claim 1 which further includes controlling means for regulating gas pressure in said heated vessel.

3. The system of claim 1 which further includes controlling means for regulating gas pressure in said granulation chamber.

4. The system of claim 1 which further includes controlling means for regulating gas pressure within said dispersion space.

5. The system of claim 1 wherein the granulation chamber is cylindrical in shape.

6. The system of claim 1 wherein the upper end of said granulation chamber is open and said apparatus further includes sealing means to close the upper end of said granulation chamber.

7. The system of claim 1 wherein said rotating disk is dish shaped.

8. The system of claim 1 wherein said rotating disk is mounted on elevation adjustment means for moving the disk up and down.

9. The system of claim 1 wherein the particle conduit means delivers produced particles from the chamber to a sizing means for filtering particles by diameter.

10. The system of claim 9 wherein the sizing means is a screening apparatus.

11. The system of claim 1 wherein said ejection of cooling gas within a predetermined radius of said rotating disk is within a predetermined radius of the centrifugal field of the rotating disk within which the molten droplets form into spherical particles.

12. The system of claim 1 wherein said rotating disk is cone shaped.

13. The system of claim 1 wherein said rotating disk is a substantially flat disk.

14. The system of claim 1 wherein said disk is 30-50 mm in diameter.

15. The system of claim 7 wherein said dish has a depth of 10-18% of the diameter of the dish.

16. The system of claim 1 further including storing means for holding gases that comprise the gases in said heated vessel, said granulation chamber and said cooling gas.

17. The system of claim 16 further including gas flow control means for separately regulating the flow of gas from said gas storing means into said heated vessel, said granulation chamber and said cooling gas ejector means.

18. The system of claim 1 further including gas pressure control means for separately regulating the pressure of gas in said heated vessel, said granulation chamber and said cooling gas ejector means.

19. The system of claim 18 wherein said gas pressure control means are vacuum pumps.

* * * * *